US012042765B2

(12) United States Patent
Simonetti et al.

(10) Patent No.: US 12,042,765 B2
(45) Date of Patent: Jul. 23, 2024

(54) ELECTROCHEMICALLY ENHANCED PROCESS FOR NEXT GENERATION CARBON DIOXIDE CAPTURE

(71) Applicant: The Regents of the University of California, Oakland, CA (US)

(72) Inventors: Dante Simonetti, Los Angeles, CA (US); David Jassby, Los Angeles, CA (US); Gaurav Sant, Los Angeles, CA (US); Yenwen Tseng, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 17/722,036

(22) Filed: Apr. 15, 2022

(65) Prior Publication Data

US 2022/0331740 A1    Oct. 20, 2022

Related U.S. Application Data

(60) Provisional application No. 63/175,761, filed on Apr. 16, 2021.

(51) Int. Cl.
*B01D 53/96* (2006.01)
*B01D 15/36* (2006.01)
(Continued)

(52) U.S. Cl.
CPC ......... *B01D 53/965* (2013.01); *B01D 15/363* (2013.01); *B01D 53/62* (2013.01);
(Continued)

(58) Field of Classification Search
CPC ...... B01D 53/965; B01D 53/78; B01D 53/62; B01D 2258/0283; B01D 2257/504;
(Continued)

(56) References Cited

U.S. PATENT DOCUMENTS

| 4,391,680 A | 7/1983 | Mani et al. |
| 5,455,013 A | 10/1995 | Shibata et al. |

(Continued)

FOREIGN PATENT DOCUMENTS

| AU | 2005/290082 B2 | 3/2011 |
| WO | WO-2000/060141 A1 | 10/2000 |

(Continued)

OTHER PUBLICATIONS

McCann et al., "Simulation of Ethalpy and Capacity of CO2 Absorption by Aqueous Amine Systems", Ind. Eng. Chem. Res. 2008, 47, 2002-2009. (Year: 2008).*

(Continued)

*Primary Examiner* — Anita Nassiri-Motlagh
(74) *Attorney, Agent, or Firm* — Foley Hoag LLP; David P. Halstead; Alexander J. Chatterley

(57) ABSTRACT

Disclosed herein are methods of electrochemically enhanced amine-based $CO_2$ capture and systems for performing the methods of amine-based $CO_2$ capture. The present methods and systems advantageously may be carried out at ambient temperatures and allow for reusing the amine through multiple cycles.

30 Claims, 5 Drawing Sheets

(51) Int. Cl.
*B01D 53/62* (2006.01)
*B01D 53/78* (2006.01)

(52) U.S. Cl.
CPC .... *B01D 53/78* (2013.01); *B01D 2252/20447* (2013.01); *B01D 2252/20484* (2013.01); *B01D 2257/504* (2013.01); *B01D 2258/0283* (2013.01); *B01D 2258/06* (2013.01)

(58) Field of Classification Search
CPC ........... B01D 2252/20484; B01D 2252/20447; B01D 15/363
USPC ........................................................ 205/411
See application file for complete search history.

(56) References Cited

U.S. PATENT DOCUMENTS

| | | | |
|---|---|---|---|
| 9,492,945 | B2 | 11/2016 | Niven et al. |
| 9,790,131 | B2 | 10/2017 | Lee et al. |
| 10,010,829 | B2 | 7/2018 | Wright et al. |
| 11,384,029 | B2 | 7/2022 | Sant et al. |
| 2008/0245672 | A1 | 10/2008 | Little et al. |
| 2011/0042230 | A1 | 2/2011 | Gilliam et al. |
| 2013/0058857 | A1 | 3/2013 | Stern et al. |
| 2015/0021184 | A1 | 1/2015 | Lin et al. |
| 2016/0362800 | A1 | 12/2016 | Ren et al. |
| 2019/0232215 | A1* | 8/2019 | Fujita ..................... B01D 53/78 |
| 2020/0062645 | A1 | 2/2020 | Gong et al. |
| 2020/0129916 | A1 | 4/2020 | Constantz et al. |
| 2020/0299203 | A1 | 9/2020 | Sant et al. |
| 2021/0031154 | A1 | 2/2021 | Nakamura et al. |
| 2021/0060484 | A1 | 3/2021 | Aziz et al. |
| 2021/0107840 | A1 | 4/2021 | Gong |
| 2021/0120750 | A1 | 4/2021 | Bourhis et al. |
| 2021/0198157 | A1 | 7/2021 | Sant et al. |
| 2021/0262320 | A1 | 8/2021 | Nguyen et al. |
| 2021/0387139 | A1 | 12/2021 | Voskian et al. |
| 2022/0331740 | A1 | 10/2022 | Simonetti |
| 2023/0058065 | A1 | 2/2023 | Sant et al. |
| 2023/0120088 | A1 | 4/2023 | Sant et al. |
| 2024/0018669 | A1 | 1/2024 | Simonetti et al. |

FOREIGN PATENT DOCUMENTS

| | | |
|---|---|---|
| WO | WO-2019/006352 A1 | 1/2019 |
| WO | WO-2022/221665 A1 | 10/2022 |
| WO | WO-2023/069370 A1 | 4/2023 |
| WO | WO-2024/020027 A1 | 1/2024 |

OTHER PUBLICATIONS

Wang et al. (Wang et al., "Technoeconomic Analysis of the Electrochemically Mediated Amine Regeneration $CO_2$ Capture Process", Ind. Eng. Chem. Res. 2020, 59, 14085-14095). (Year: 2020).*
Pal et al., "Adsorptive removal of heat stable salt anions from industrial lean amine solvent using anion exchange resins from gas sweetening unit", Journal of Natural Gas Science and Engineering 15 (2013) 14-21. (Year: 2013).*
International Search Report and Written Opinion for Application No. PCT/US2022/025028 dated Jul. 13, 2022.
Adenier et al., "Electrochemical Oxidation of Aliphatic Amines and Their Attachment to Carbon and Metal Surfaces," Langmuir, 20: 8243-8253 (2004).
Arshad et al., "Equilibrium Solubility of $CO_2$ in Alkanolamines," DTU Libraryy: 5 pages (2013).
Dutcher et al., "Amine-Based $CO_2$ Capture Technology Development from the Beginning of 2013—A Review," Applied Materials & Interfaces, 7: 2137-2148 (2015).
Eisaman et al., "$CO_2$ separation using bipolar membrane electrodialysis," Energy & Environmental Science, 4: 1319-1328 (2011).
Erans et al., "Direct air capture: process technology, technoeconomic and socio-political challenges," Energy & Environmental Science, 15: 1360-1405 (2022).
Husebye et al., "Techno economic evaluation of amine based $CO_2$ capture: impact of $CO_2$ concentration and steam supply," Energy Procedia, 23: 381-390 (2012).
Ivy., "Summary of Electrolytic Hydrogen Production Milestone Completion Report," National Renewable Energy Laboratory: 27 pages (2004).
Keith et al., "A Process for Capturing $CO_2$ from the Atmosphere," Joule, 2: 1573-1594 (2018).
Keith et al., "Climate Strategy with $CO_2$ Capture From the Air," Climatic Changes: 29 pages (2005).
Liu et al., "Electrochemically mediated carbon dioxide separation with quinone chemistry in salt-concentrated aqueous media," Nature Communications, 11: Article No. 2278 pp. 1-11 (2020).
Lv et al., "Mechanisms of $CO_2$ Capture into Monoethanolamine Solution with Different $CO_2$ Loading during the Absorption/Desorption Processes," Enviromental Science & Technology, 49: 10728-10735 (2015).
MacDowell et al., "An overview of $CO_2$ capture technologies," Energy & Environmental Science, 3: 1645-1669 (2010).
Mezza et al., "An Electrochemical Platform for the Carbon Dioxide Capture and Conversion to Syngas," Energies, 14: 7869 pp. 1-13 (2021).
Rahimi et al., "Bench-scale demonstration of $CO_2$ capture with an electrochemically driven proton concentration process," RSC Advances, 10: 16832 (2020).
Rau et al., "Direct electrolytic dissolution of silicate minerals for air $CO_2$ mitigation and carbon-negative $H_2$ production," PNAS, 110(25): 10095-10100 (2013).
Rinberg et al., "Alkalinity Concentration Swing for Direct Air Capture of Carbon Dioxide," ChemSusChem, 14: 1-16 (2021).
Roussanaly et al., "Techno-economic analysis of MEA $CO_2$ capture from a cement kiln-impact of steam supply scenario," Energy Procedia, 114: 6229-6239 (2017).
Sabatino et al., "Evaluation of a Direct Air Capture Process Combining Wet Scrubbing and Bipolar Membrane Electrodialysis," Industrial & Engineering Chemistry Research, 59: 7007-7020 (2020).
Sakwattanapong et al., "Behavior of Reboiler Heat Duty for $CO_2$ Capture Plants Using Regenerable Single and Blended Alkanolamines," Ind. Eng. Chem. Res., 44: 4465-4473 (2005).
Shu et al., "Electrochemical Regeneration of Spent Alkaline Absorbent from Direct Air Capture," Environmental Science & Technology, 54: 8890-8998 (2020).
Stern et al., "Bench-scale demonstration of $CO_2$ capture with electrochemically-mediated amine regeneration," RSC Advances, 4: 5906-5914 (2014).
Stern et al., "Post-combustion carbon dioxide capture using electrochemically mediated amine regeneration," Energy & Environmental Science, 6: 2505-2517 (2013).
Stripe Carbon Removal Purchase Application submitted Mar. 31, 2022.
Voskian et al., "Faradaic electro-swing reactive adsorption for $CO_2$ capture," Energy & Environmental Science, 12: 3530-3547 (2019).
Wang et al., "$CO_2$ Capture Using Electrochemically Mediated Amine Regeneration," Massachusetts Institute of Technology: 27 pages (2020).
Wang et al., "Energetics of electrochemically mediated amine regeneration process for flue gas $CO_2$ capture," International Journal of Greenhouse Gas Control, 82: 48-58 (2019).
Wang et al., "Flue gas $CO_2$ capture via electrochemically mediated amine regeneration: System design and performance," Applied Energy, 255: 113879 (2019).
La Plante et al. "Electrolytic seawater mineralization and how it ensures (net) carbon dioxide removal", Submitted to ACS ES&T Engineering, Jan. 2023, 23 pages.
U.S. Appl. No. 18/121,843, Pending.
U.S. Appl. No. 18/047,633, Pending.
U.S. Appl. No. 18/223,460, Pending.

(56) References Cited

OTHER PUBLICATIONS

Abbasi et al., "An investigation of the effect of RuO2 on the deactivation and corrosion mechanism of a Ti/IrO2+ Ta2O5 coating in an OER application", *Journal of Electroanalytical Chemistry* 777: 67-74 (2016).
Falzone et al., "New insights into the mechanisms of carbon dioxide mineralization by portlandite", AIChE Journal 67(5): e17160 (2021).
Fujimura et al., "Oxygen evolution on manganese-molybdenum oxide anodes in seawater electrolysis", *Materials Science and Engineering: A* 267.2: 254-259 (1999).
Hashimoto et al., "Advanced materials for global carbon dioxide recycling", *Materials Science and Engineering: A* 304: 88-96 (2001).
International Search Report and Written Opinion for International Application No. PCT/US2022/046917 dated Feb. 8, 2023.
Kiani et al., "Techno-economic assessment for CO2 capture from air using a conventional liquid-based absorption process," Frontiers in Energy Research 8: 92 (2020).
Marshall et al., "A review of adhesion science", *Dental materials* 26.2: e11-e16 (2010).
Sanz-Pérez et al., "Direct Capture of CO2 from Ambient Air", Chem. Rev., 2016, vol. 116, pp. 11840-11876, 37 pages.
Tang et al., "Advances in the application of manganese dioxide and its composites as electrocatalysts for the oxygen evolution reaction", *Journal of Materials Chemistry A* 8(36): 18492-18514 (2020).
Ahmad et al., "CO2 removal using membrane gas absorption with PVDF membrane incorporated with POSS and SAPO-34 zeolite", *Chemical Engineering Research and Design* 118: 238-247 (2017).
Anantharaj et al., "Spinel cobalt titanium binary oxide as an all-non-precious water oxidation electrocatalyst in acid." *Inorganic Chemistry* 58.13 (2019): 8570-8576.
Balaji et al., "An alternative approach to selective sea water oxidation for hydrogen production." *Electrochemistry Communications* 11.8 (2009): 1700-1702.
Bennett, "Electrodes for generation of hydrogen and oxygen from seawater." *International Journal of Hydrogen Energy* 5.4 (1980): 401-408.
Bhardwaj et al., "Ultrathin silicon oxide overlayers enable selective oxygen evolution from acidic and unbuffered pH-neutral seawater." *ACS Catalysis* 11.3 (2021): 1316-1330.
Cheng et al., "Synergistic action of Co—Fe layered double hydroxide electrocatalyst and multiple ions of sea salt for efficient seawater oxidation at near-neutral pH." *Electrochimica Acta* 251 (2017): 336-343.
Choi et al., "A Reflection on Sustainable Anode Materials for Electrochemical Chloride Oxidation." *Advanced Materials* 35.43 (2023): 2300429.
De Lannoy et al., "Indirect ocean capture of atmospheric CO2: Part I. Prototype of a negative emissions technology." *International journal of greenhouse gas control* 70 (2018): 243-253.
El-Moneim et al., "Mn—Mo—Sn oxide anodes for oxygen evolution in seawater electrolysis for hydrogen production." *ECS Transactions* 25.40 (2010): 127.
El-Moneim et al., "Nanocrystalline manganese-molybdenum-tungsten oxide anodes for oxygen evolution in acidic seawater electrolysis." *Materials transactions* 46.2 (2005): 309-316.
El-Moneim, "Mn—Mo—W-oxide anodes for oxygen evolution during seawater electrolysis for hydrogen production: effect of repeated anodic deposition." *International journal of hydrogen energy* 36.21 (2011): 13398-13406.
Escudero-Escribano et al. "Importance of surface IrOx in stabilizing RuO2 for oxygen evolution." *The Journal of Physical Chemistry B* 122.2 (2018): 947-955.
Frydendal et al., "Toward an active and stable catalyst for oxygen evolution in acidic media: Ti-stabilized MnO2." *Advanced Energy Materials* 5.22 (2015): 1500991.
Fujimura et al., "Anodically deposited manganese-molybdenum oxide anodes with high selectivity for evolving oxygen in electrolysis of seawater." *Journal of Applied Electrochemistry* 29 (1999): 769-775.

Fujimura et al., "The durability of manganese-molybdenum oxide anodes for oxygen evolution in seawater electrolysis." *Electrochimica acta* 45.14 (2000): 2297-2303.
Gayen et al., "Selective seawater splitting using pyrochlore electrocatalyst." *ACS Applied Energy Materials* 3.4 (2020): 3978-3983.
Hashimoto et al., "New nanocrystalline manganese-molybdenum-tin oxide anodes for oxygen evolution in seawater electrolysis." *ECS Transactions* 1.4 (2006): 491-497.
Hine et al., "Electrochemical Behavior of the Oxide-Coated Metal Anodes." *Journal of the Electrochemical Society* 126.9 (1979): 1439.
Huynh et al., "A functionally stable manganese oxide oxygen evolution catalyst in acid." *Journal of the American Chemical Society* 136.16 (2014): 6002-6010.
Huynh et al., "Design of template-stabilized active and earth-abundant oxygen evolution catalysts in acid." *Chemical science* 8.7 (2017): 4779-4794.
Huynh et al., "Nature of activated manganese oxide for oxygen evolution." *Journal of the American Chemical Society* 137.47 (2015): 14887-14904.
Iizuka et al., "Carbon dioxide recovery from carbonate solutions using bipolar membrane electrodialysis", Separation and purification technology 101: 49-59 (2012).
International Search Report and Written Opinion for International Application No. PCT/US2023/028023 dated Nov. 8, 2023.
Izumiya et al., "Anodically deposited manganese oxide and manganese-tungsten oxide electrodes for oxygen evolution from seawater." *Electrochimica Acta* 43.21-22 (1998): 3303-3312.
Izumiya et al., "Mn—W oxide anodes prepared by thermal decomposition for oxygen evolution in seawater electrolysis." *Materials transactions, JIM* 39.2 (1998): 308-313.
Izumiya et al., "Surface activation of manganese oxide electrode for oxygen evolution from seawater." *Journal of applied electrochemistry* 27 (1997): 1362-1368.
Kato et al., "Electrochemical characterization of degradation of oxygen evolution anode for seawater electrolysis." *Electrochimica Acta* 116 (2014): 152-157.
Kato et al., "Durability enhancement and degradation of oxygen evolution anodes in seawater electrolysis for hydrogen production." *Applied surface science* 257.19 (2011): 8230-8236.
Kwong et al., "Cobalt-doped hematite thin films for electrocatalytic water oxidation in highly acidic media." *Chemical Communications* 55.34 (2019): 5017-5020.
Kwong et al., "High-performance iron (III) oxide electrocatalyst for water oxidation in strongly acidic media." *Journal of Catalysis* 365 (2018): 29-35.
La Plante et al., "Electrolytic Seawater Mineralization and the Mass Balances That Demonstrate Carbon Dioxide Removal." *ACS ES&T Engineering* (2023).
Li et al., "Enhancing the stability of cobalt spinel oxide towards sustainable oxygen evolution in acid." *Nature Catalysis* 5.2 (2022): 109-118.
Li et al., "Oxygen evolution and corrosion behaviours of the porous Mn5Si3 electrode in sulfuric acid." *Materials Research Express* 6.8 (2019): 085542.
Li et al., "Stable potential windows for long-term electrocatalysis by manganese oxides under acidic conditions." *Angewandte Chemie* 131.15 (2019): 5108-5112.
Matsui et al., "Anodically deposited manganese-molybdenum-tungsten oxide anodes for oxygen evolution in seawater electrolysis." *Journal of applied electrochemistry* 32 (2002): 993-1000.
McCrory et al., "Benchmarking heterogeneous electrocatalysts for the oxygen evolution reaction." *Journal of the American Chemical Society* 135.45 (2013): 16977-16987.
Minke et al., "Is iridium demand a potential bottleneck in the realization of large-scale PEM water electrolysis ?." *International journal of hydrogen energy* 46.46 (2021): 23581-23590.
Moreno-Hernandez, Ivan A., et al. "Crystalline nickel manganese antimonate as a stable water-oxidation catalyst in aqueous 1.0 MH 2 SO 4." *Energy & Environmental Science* 10.10 (2017): 2103-2108.

(56) References Cited

OTHER PUBLICATIONS

Muroyama et al., "CO2 separation and transport via electrochemical methods", Journal of The Electrochemical Society 167.13: 133504 (2020).

Nagasawa et al., "A new recovery process of carbon dioxide from alkaline carbonate solution via electrodialysis", AIChE journal 55.12: 3286-3293 (2009).

Okada et al., "A bilayer structure composed of Mg| Co—MnO2 deposited on a Co (OH) 2 film to realize selective oxygen evolution from chloride-containing water." *Langmuir* 36.19 (2020): 5227-5235.

Pan et al., "Efficient and stable noble-metal-free catalyst for acidic water oxidation." *Nature communications* 13.1 (2022): 2294.

Retuerto et al., "Highly active and stable OER electrocatalysts derived from Sr2MIrO6 for proton exchange membrane water electrolyzers." *Nature Communications* 13.1 (2022): 7935.

Seh et al., "Combining theory and experiment in electrocatalysis: Insights into materials design." *Science* 355.6321 (2017): eaad4998.

Seitz et al., "A highly active and stable IrOx/SrIrO3 catalyst for the oxygen evolution reaction." *Science* 353.6303 (2016): 1011-1014.

Stolaroff et al., "Carbon dioxide capture from atmospheric air using sodium hydroxide spray", Environmental science & technology 42.8: 2728-2735 (2008).

Technical Data Sheet fumasep © FBM, from Fumasep available online at https://www.bwt.com/en/-/media/bwt/fumatech/datasheets/new/fu masep/water-treatment-processes/fu masep-fbm-wet-formv22. pdf, accessed on Mar. 6, 2024 (Year: 2024).

Tong et al., "Electrolysis of low-grade and saline surface water." *Nature Energy* 5.5 (2020): 367-377.

Vos et al., "MnOx/IrOx as selective oxygen evolution electrocatalyst in acidic chloride solution." *Journal of the American Chemical Society* 140.32 (2018): 10270-10281.

Wu et al., "Non-iridium-based electrocatalyst for durable acidic oxygen evolution reaction in proton exchange membrane water electrolysis." *Nature Materials* 22.1 (2023): 100-108.

Xu et al., "Calcination temperature dependent catalytic activity and stability of IrO2—Ta2O5 anodes for oxygen evolution reaction in aqueous sulfate electrolytes." *Journal of The Electrochemical Society* 164.9 (2017): F895-F900.

Xu et al., "Electrogeneration of hydrogen peroxide using Ti/IrO2—Ta2O5 anode in dual tubular membranes Electro-Fenton reactor for the degradation of tricyclazole without aeration." *Chemical Engineering Journal* 295 (2016): 152-159.

Yang et al., "Highly acid-durable carbon coated Co3O4 nanoarrays as efficient oxygen evolution electrocatalysts." *Nano Energy* 25 (2016): 42-50.

Yu et al., "Sustainable oxygen evolution electrocatalysis in aqueous 1 M H2SO4 with earth abundant nanostructured Co3O4." *Nature communications* 13.1 (2022): 4341.

Zhao et al., "Charge state manipulation of cobalt selenide catalyst for overall seawater electrolysis." *Advanced Energy Materials* 8.29 (2018): 1801926.

Zheng, "Binary platinum alloy electrodes for hydrogen and oxygen evolutions by seawater splitting." *Applied Surface Science* 413 (2017): 72-82.

Zheng, "Pt-free NiCo electrocatalysts for oxygen evolution by seawater splitting." *Electrochimica Acta* 247 (2017): 381-391.

Zhou et al., "Rutile alloys in the Mn—Sb—O system stabilize Mn3+ to enable oxygen evolution in strong acid." *Acs Catalysis* 8.12 (2018): 10938-10948.

\* cited by examiner

ELECTROCHEMICALLY ENHANCED PROCESS FOR NEXT GENERATION CARBON DIOXIDE CAPTURE

CROSS-REFERENCE TO RELATED APPLICATIONS

This application claims the benefit of priority to U.S. Provisional Patent Application No. 63/175,761, filed Apr. 16, 2021, the contents of which are incorporated herein by reference in their entirety.

BACKGROUND

The management of existing atmospheric carbon dioxide and ongoing carbon dioxide emissions is needed to limit the increase in the global average temperature and to reduce the effects of climate change. To realistically achieve this, 10-20 Gt $CO_2$ per year needs to be removed from the atmosphere within the next century, necessitating carbon management strategies that can be implemented at a large scale. The current state of the art in $CO_2$ capture technology uses amine-based absorption to remove $CO_2$. But these amine-based processes use between 0.8-5.0 MWh of thermal energy per tonne of $CO_2$ captured to desorb less than 50% of the $CO_2$ in the saturated amine. This high heat duty leads to (1) the use of large scale distillation equipment, (2) low working $CO_2$ absorption capacities of the amine solution (e.g., less than 0.3 mol $CO_2$ per mol monoethanolamine (MEA)), and (3) solvent loss via chemical degradation and evaporation. The existing approach to releasing the $CO_2$ and regenerating the amine is a thermal process in which the solution is heated to elevated temperatures (>140° C.). At these temperatures, the carbamate decomposes to yield the original amine molecule and release $CO_2$ as a concentrated vapor[3, 5-6]. However, large thermal duties (e.g., >5 MWh/tonne of $CO_2$ for a working capacity of 0.05 mol/mol for DAC applications)[3] render such thermal processes economically unattractive. Furthermore, the high temperatures required for amine regeneration can result in solvent loss via chemical degradation and evaporation[3]. These factors can result in up to a 50% increase in capital expenditures (CAPEX) and up to 25% increase in operating expenses (OPEX) which lead to high costs of carbon capture (>$100 per tonne $CO_2$)[7-8] and restricts the use of amine-based processes to point source emitters such as fossil-fuel fired power plants.

These factors also limit the adoption of amine-based $CO_2$ capture by other industries including petrochemicals, steel making, cement, and direct air capture (DAC), where smaller scale and/or more energy efficient processes are desired for economic integration.

Copper electrochemistry has been attempted for amine-based $CO_2$ capture,[9-16] using a complexation reaction between a metal (i.e., Cu' ions) and the amine which decomposes the carbamate ion and releases $CO_2$.[11-12, 14-16] This complexation reaction is electrochemically driven at the anode where $Cu^{2+}$ ions are generated from oxidation of Cu metal, with the Cu-amine complex being regenerated back to amines with $Cu^{2+}$ being reduced to Cu metal at the cathode. The aforementioned system was extended to electrochemical $CO_2$ capture on solid polyanthraquinones.[9, 13] In the foregoing system, a Faradaic electro-swing process is used to capture $CO_2$ via carboxylation reactions (reduction) with quinones (with polyvinylferrocene being oxidized) followed by reversing the polarity of the cell to decompose the carboxyl-quinone compound (and reduce the polyvinyl-ferrocene), thereby desorbing $CO_2$ and regenerating the polyanthraquinone. While these previous electrochemical processes have exhibited high working capacities (as much as 0.62 mol $CO_2$ per mol amine for 12% v/v $CO_2$ streams) and low energy requirements (theoretical minimum requirements of ~0.60 MWh per t $CO_2$), they also require complicated Cu-based redox chemistry with expensive diamines or quinones. Furthermore, the electrochemistry operates directly on the amine. These features could lead to high extents of amine or electrode degradation and more expensive CAPEX/OPEX.[17]

Accordingly, there is a need for methods and systems to address these capacity, energy, and recyclability limitations of amine-based carbon dioxide capture processes. The present disclosure addresses these needs.

SUMMARY OF THE INVENTION

Provided herein are methods and systems for electrochemically enhanced amine-based carbon captures. In some embodiments, the present disclosure provides a method of capturing $CO_2$, comprising:
i) reacting a $CO_2$ source gas with a stoichiometric excess of an amine in an aqueous solution to form an amine-$CO_2$ complex, thereby forming a solution comprising the amine-$CO_2$ complex;
ii) electrochemically adjusting the pH of the solution comprising the amine-$CO_2$ complex to less than 7, thereby releasing $CO_2$ from the amine-$CO_2$ complex; and
iii) collecting the released $CO_2$ as a concentrated vapor.

In some embodiments, the amine-$CO_2$ complex comprises carbamate ions.

In some embodiments, the step of adjusting the pH is performed using water electrolysis.

In some embodiments, the pH of the solution after adjustment is about 0.5 to about 7, about 0.5 to about 6, about 0.5 to about 5, about 0.5 to about 4, about 0.5 to about 3, about 0.5 to about, or preferably. In other preferred embodiments, the pH is adjusted to about 5 to about 6.

The amine may be a primary amine, a secondary amine, a tertiary amine, or a mixture thereof. In preferred embodiments, the amine is a primary amine or a secondary amine. More particularly, the amine has the structure of formula I:

$$R_xNH_{3-x}, \quad (I);$$

wherein R is selected from an optionally substituted alkyl, ether, and hydroxyalkyl;
x is 1, 2 or 3, and;
one or more R, together with each N, optionally forms a nitrogen containing heterocycle.

Amines useful in the present methods include, in some embodiments, monoethanolamine, 2-ethylaminoethanol, 2-methylaminoethanol, ethylenediamine, benzylamine, diethanolamine, pyrrolidine, morpholine, 2,6-dimethylmorpholine, monoisopropanolamine, piperazine 2-(dimethylamino)ethanol, N-tert-butyldiethanolamine, 3-dimethylamino-1-propanol, 3-(dimethylamino)-1,2-propanediol, 2-diethylaminoethanol, 3-diethylamino-1,2-propanediol, 3-diethylamino-1-propanol, triethanolamine, 1-dimethyl amino-2-propanol, 1-(2-hydroxyethyl)pyrrolidine, 1-diethylamino-2-propanol, 3-pyrrolidino-1,2-propanediol, 2-(diisopropylamino)ethanol, 1-(2-hydroxyethyl)piperidine, 2-(dimethylamino)-2-methyl-1-propanol, 3-piperidino-1,2-propanediol, 3-dimethylamino-2,2-dimethyl-1-propanol, 3-hydroxy-1-methylpiperidine, N-ethyldiethanolamine, 1-ethyl-3-hydroxypiperidine, and any combination thereof.

Preferably, the amine is monoethanolamine, piperazine, or a mixture thereof. In certain preferred embodiments, the amine is monoethanolamine, and in certain particularly preferred embodiments, the amine is piperazine.

In some embodiments, the concentration of the amine in the aqueous amine solution is about 10% to about 50% v/v. In other embodiments, the concentration of the amine is about 15% to about 40% v/v, about 20 to about 30% v/v, or more preferably, about 22%.

The $CO_2$ source gas may be, in some embodiments, effluent from an industrial source. In other embodiments, the $CO_2$ source gas is from an atmospheric source, e.g., atmospheric air. In further embodiments, the $CO_2$ source gas is a mixture of effluent from an industrial source and atmospheric air. In some embodiments, the gas from the industrial source comprises about 1 to about 12% v/v $CO_2$.

In particular embodiments, the step of adjusting the pH is performed at a temperature of less than 100° C., preferably about −10° C. to about 50° C., more preferably about −10° C. to about 50° C.

In some embodiments, the method further comprises regenerating and collecting the aqueous amine solution and using the regenerated amine in step (i) of the method.

In some embodiments, the concentrated vapor comprises about 2% to about 99% $CO_2$.

The present disclosure further provides systems for amine-based $CO_2$ capture. In some embodiments, a system for capturing $CO_2$ from a $CO_2$ source gas comprises:

a $CO_2$ absorption chamber configured to contain an aqueous amine solution, the $CO_2$ absorption chamber having a $CO_2$ source gas inlet, and a concentrated $CO_2$ vapor outlet;

an electrochemical cell in fluid communication with the $CO_2$ absorption chamber and configured to receive a $CO_2$ rich amine solution from the $CO_2$ absorption chamber, the electrochemical cell comprising:

an anode disposed in an anode chamber, a cathode disposed in a cathode chamber, a first cation exchange membrane disposed between the anode chamber and a first reservoir configured to receive a $CO_2$-rich aqueous amine solution such that protons may flow from the anode chamber to the first reservoir, an anion exchange membrane disposed between the first reservoir and a salt reservoir such that anions from the salt reservoir may flow towards the anode chamber, a second cation exchange membrane disposed between the salt reservoir and the cathode chamber such that cations may flow from the salt reservoir toward the cathode chamber; and an anion exchange column in fluid communication with the electrochemical cell and configured to: receive a $CO_2$-lean aqueous amine solution from the first reservoir, deliver a regenerated aqueous amine solution to the $CO_2$-absorption chamber, and receive a catholyte from the cathode chamber.

The system may further comprise a concentrated $CO_2$ vapor outlet. In further embodiments, the system comprises an $H_2$ outlet in fluid communication with the cathode chamber. In still further embodiments, the system comprises an $O_2$ outlet in fluid communication with the anode chamber.

In some embodiments, the electrochemical cell is configured to perform water electrolysis.

BRIEF DESCRIPTION OF THE DRAWINGS

In FIG. 4B, * represents the use of HCl/NaOH, # represents electrochemical acidification followed by NaOH addition, and ° represents electrochemical acidification followed by ion exchange. All experiments were carried out using a 22% v/v MEA solution with an initial loading of ~0.5 mol $CO_2$ per mol MEA.

DETAILED DESCRIPTION

The present disclosure generally provides methods and systems for amine-based carbon capture. More specifically, the disclosure provides in some embodiments a method of capturing $CO_2$, comprising: reacting a $CO_2$ source gas with an aqueous solution comprising a stoichiometric excess of an amine to form an amine-$CO_2$ complex; adjusting the pH of the solution electrochemically to less than about 7, thereby releasing $CO_2$ from the amine-$CO_2$ complex; and collecting the released $CO_2$ as a concentrated vapor. In certain embodiments, the disclosure advantageously allows for regeneration of amine solution at ambient temperatures (e.g., less than 100° C., preferably about −10 to about 50° C. and more preferably about 10 to about 40° C. and 100° C.). $CO_2$ absorption in a basic (e.g., pH greater than about 8, greater than about 9, or preferably greater than about 10) aqueous amine solution occurs via reaction of $CO_2$ with the amine to form stable a carbamate ion and protons/hydronium ions. The present methods advantageously electrochemically induce a pH shift to decompose the carbamate ion via acid-hydrolysis. This pH-shift to pH≤7 occurs at ambient temperature, and therefore, (1) uses simpler process equipment, (2) allows for amine regeneration and thus, maximizes working capacity and (3) reduces solvent loss. In some embodiments, the pH is adjusted to less than 7, less than 6, less than 5, less than 4, less than 3, less 2 or less than 1. In some embodiments, the pH is adjusted to about 0.5 to about 7, about 0.5 to about 6, about 0.5 to about 5, about 0.5 to about 4, about 0.5 to about 3, about 0.5 to about 2, or about 0.5 to about 1. In some embodiment, the pH is adjusted to about 5 to about 6, while in other embodiments, the pH is adjusted to about 0.5 to about 1.5.

Figure 1:
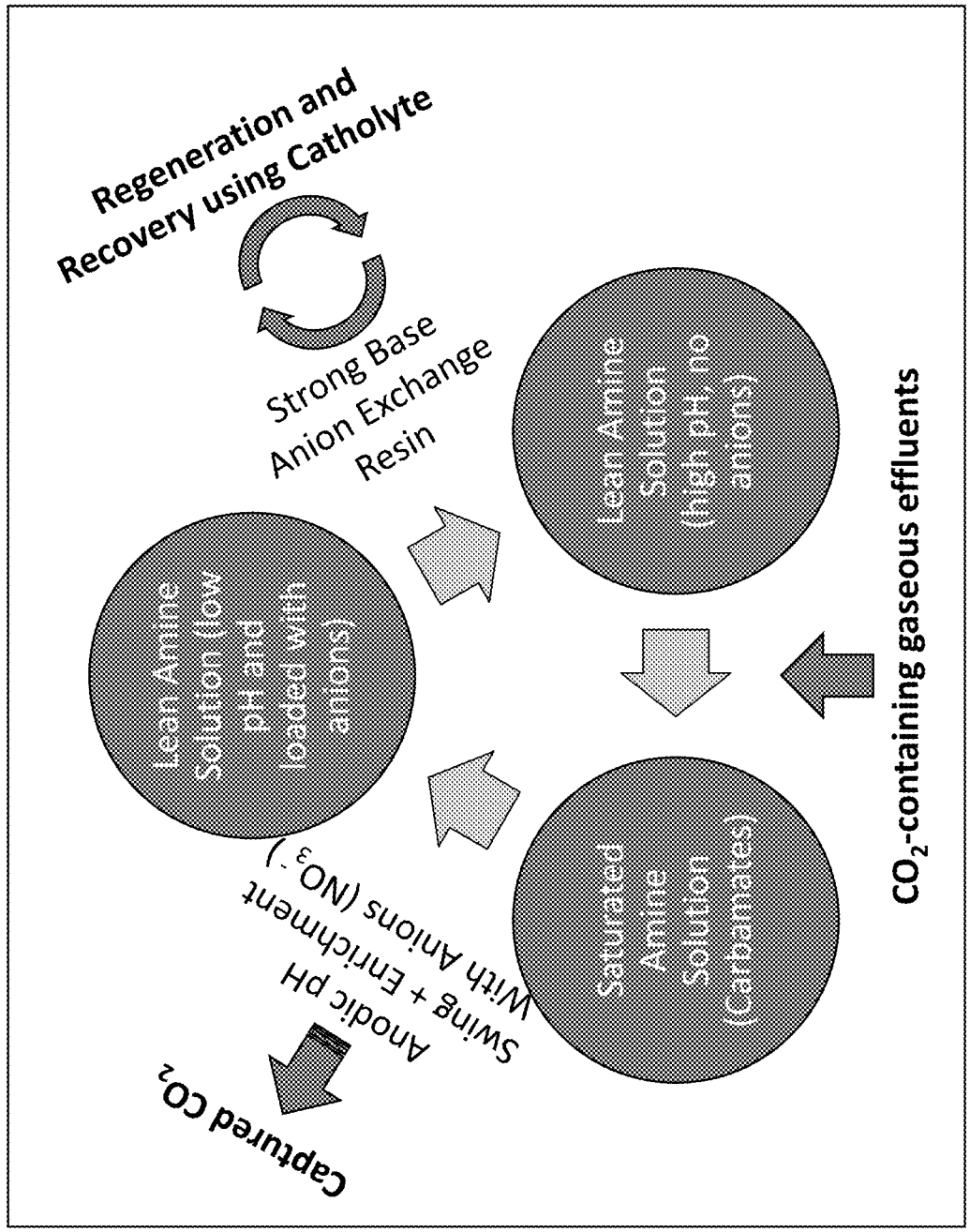
FIG. 1 is a schematic of an exemplary $CO_2$ capture process in accordance with the present disclosure. $CO_2$ is absorbed from a gaseous stream, such as atmospheric air or industrial process gas, into an aqueous amine solution. $CO_2$ is then desorbed from the amine via electrochemically induced acidification. The amine solution is regenerated using a strong base anion exchange resin so that it may be used for further $CO_2$ absorption. The strong base anion exchange resin may then be regenerated using the alkaline catholyte produced during the electrochemical step.

In some embodiments, the energy intensity of the present methods is about 2× lower (e.g., 2.0 MWh per ton $CO_2$) than current state-of-the-art amine-based $CO_2$ capture processes (4.0 MWh per ton $CO_2$ for KOH and >5.0 MWh per ton $CO_2$ for MEA[1-3]), with reduced hazardous chemical inputs and the possibility of using renewable energy. In some embodiments, the disclosure herein provides amine-based $CO_2$ capture processes (FIG. 1), which integrate electrochemical cells for ambient-temperature regeneration of the aqueous amine solution. In some embodiments, the amine-based processes of the present disclosure include electrochemically generated acidification to desorb the $CO_2$, thereby reducing heat and power requirements and to increase working solvent capacity. These process improvements may advantageously lead to reduced size, and land requirements, and environmental footprints of $CO_2$ capture systems.

Energy-Efficient Electrochemical Regeneration of Amine Solutions

Under basic conditions (pH>10), $CO_2$ absorption occurs via the reaction of $CO_2$ with the amine (e.g., MEA; $RNH_2$ where $R=CH_2CH_2OH$) to form carbamate anions ($RNHCOO^-$, $RNCOO^{2-}$), protonated amines ($RNH_3^+$), and protons/hydronium ions ($H^+/H_3O^+$), according to Equations 1-3, while other gases, such as $N_2$ and $O_2$, escape in the effluent. $CO_2$ also forms carbonates at high pH (Equation 4)[4].

$$RNH_2+CO_2 \rightarrow H^+ + RNHCOO^- \quad (1)$$

$$RNHCOO^- + RNH_2 \rightarrow RNH_3^+ + RNCOO^{2-} \quad (2)$$

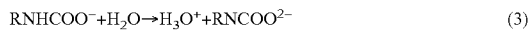
$$RNHCOO^- + H_2O \rightarrow H_3O^+ + RNCOO^{2-} \quad (3)$$

$$CO_2 + H_2O \rightarrow CO_3^{2-} + 2H^+ \quad (4)$$

Electrochemically shifting the pH of the solution to acidic conditions (e.g., pH≤7) favors the decomposition of the carbamate ions via acid-hydrolysis according to the reverse of Equations (1) and (3). Water electrolysis generates the protons for carbamate ion hydrolysis, thereby converting a $CO_2$-rich amine solution to a $CO_2$-lean solution, and hydroxide ions that are used to increase the pH of the $CO_2$-lean solution for subsequent cycles of $CO_2$ absorption.

In certain embodiments, protons are generated from an aqueous solution at the anode with hydroxide ions generated at the cathode in an electrochemical cell (FIG. 2) according to equations 5 and 6:

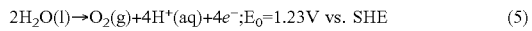
$$2H_2O(l) \rightarrow O_2(g) + 4H^+(aq) + 4e^-; E_0 = 1.23V \text{ vs. SHE} \quad (5)$$

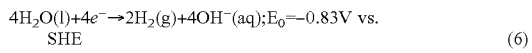
$$4H_2O(l) + 4e^- \rightarrow 2H_2(g) + 4OH^-(aq); E_0 = -0.83V \text{ vs. SHE} \quad (6)$$

In certain embodiments, the protons diffuse into the $CO_2$-rich amine solution across a cation exchange membrane (CEM) resulting in a decrease in the pH which leads to the decomposition of carbamate ions and release of $CO_2$. In certain embodiments, the CEM prevents diffusion of carbamate anions into the anode chamber, thereby preventing electrooxidation of carbamates/amine. In certain embodiments, a concentrated salt solution (e.g., NaCl or $NaNO_3$) provides counter anions to the amine solution and cations to the catholyte to maintain electroneutrality. In certain embodiments, an anion exchange membrane (AEM) prevents the diffusion of the salt solution cations into the aqueous amine chamber. In certain embodiments, after $CO_2$ is released, the $CO_2$-lean amine solution is restored to high pH using a strong base anion exchange resin (see FIG. 1). In certain embodiments, this resin exchanges the counterions ($Cl^-$ or $NO_3^-$) from the salt reservoir that have accumulated in the amine solution with hydroxide ions to increase the pH of the $CO_2$-lean aqueous amine solution to its original basic value. The strong base anion exchange resin is then regenerated using the hydroxide rich solution from the cathode chamber of the electrochemical cell, thereby recovering the anions used in the salt solution chamber. In certain embodiments, the regeneration process allows efficient recycling of the aqueous amine solution, thereby minimizing operating costs and preventing waste generation.

Accordingly, the present electrochemically-induced pH-swing process of the present disclosure has the advantages of replacing hazardous, expensive, and carbon-intensive reagents (e.g., mineral acids) with an abundant and benign proton source (e.g., water), while optionally leveraging renewable energy to facilitate the process.

While not being bound by theory, using water electrolysis for amine regeneration according to the present methods has at least two significant advantages. First, performing water electrolysis in isolated anode/cathode cell chambers allows for localized generation of protons without using stoichiometric or expensive/exotic regents, catalysts, or materials, and with reduced risk of electrochemical degradation of the amines/electrodes. Second, water electrolysis at the cathode generates $H_2$, thereby providing an opportunity for realistic energy requirements of 2.0 MWh/tonne $CO_2$ by capturing and using the evolved $H_2$. An additional benefit of using electrochemical processes is that up to 100% of the required energy can be supplied from renewable sources. These features impact both the process equipment and energy efficiencies. Complete or near complete regeneration of the amine molecules at ambient temperature can be achieved via acid-mediated carbamate decomposition. This impacts process equipment by (1) reducing the amount of amine used by an amount that is proportional to the $CO_2$ working capacity increase and (2) replacing complex distillation towers with simpler, modular electrochemical cells and, in some embodiments, separate anion exchange columns. Simpler process equipment has the potential for reducing CAPEX (e.g., less than the >$60 million investment cost for an amine stripper column[7]) and increasing the flexibility and modularity of the system, both of which would allow for the use of the process in a wider array of applications including concentrated and dilute $CO_2$ streams (e.g., capture from industrial process and directly from air). In some embodiments, the concentration of the absorbed $CO_2$ may range from 300 ppm to 250,000 ppm. In certain such embodiments, the concentration of the absorbed $CO_2$ may range from 350 ppm to 20,000 ppm. In certain embodiments, preferably wherein the method of the disclosure is being used for direct air capture of $CO_2$, the concentration of $CO_2$ may range from 400 ppm to 1,000 ppm.

Figure 3:
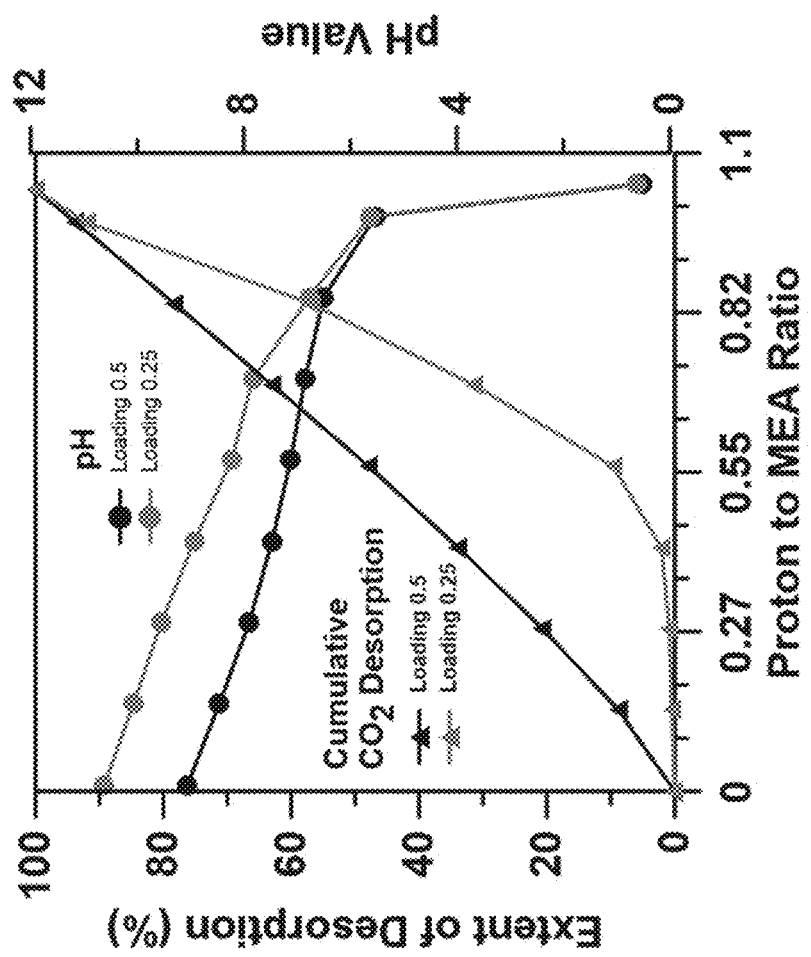
FIG. 3 is a graph depicting pH values (circles) and extents of $CO_2$ desorption (triangles) at various proton to MEA ratios for 22 vol % aqueous MEA solutions with $CO_2$ loadings of 0.25 (grey) and 0.5 (black) mol $CO_2$ per mol MEA.

Realistic energy requirements for the electrochemically enhanced amine process can be estimated based on the number of protons required to desorb $CO_2$ and on electrolyzers operating at ~80% efficiency (e.g., 68 kWh per kg $H_2$ produced[18] assuming a thermodynamic demand of 54.8 kWh/kg for the stoichiometric hydrogen evolution reaction and oxygen evolution reaction as shown in equations (5) and (6)[19]). For example, titration of a 22% MEA solution at various $CO_2$ loadings (FIG. 3; 0.25 and 0.5 mol $CO_2$ per mol MEA) shows that ~1.0 mol of $H^+$ per mol of amine is used for a pH decrease from 12 to 0.6, at which point all of the $CO_2$ is desorbed. From this information, energy requirements can be estimated for certain embodiments of disclosure: (1) Direct Air Capture with an initial MEA loading is 0.25 mol $CO_2$ per mol MEA[20] and (2) industrial effluents containing between 1-12% $CO_2$ (initial loading of 0.5 mol $CO_2$ per mol MEA).

In some embodiments, the ratio of protons to $CO_2$ is ~4 for complete desorption in a Direct Air Capture application. In some such embodiments, using currently available electrolyzers, the process would require 6.3 MWh/tonne $CO_2$ removed. In certain embodiments, if ~70% of the $H_2$ energy is recovered, this value decreases to 3.8 MWh/tonne $CO_2$ removed. At 95% cell efficiency, the energy requirements may be 5.3 and 2.8 MWh/tonne $CO_2$ without and with $H_2$ recovery, respectively. By comparison, for a traditional thermal swing process, the reboiler duty required to desorb $CO_2$ from a loading of 0.30 to 0.25 mol $CO_2$ per mol MEA is ~5.0 MWh/tonne $CO_2$[3], and the duty required for complete desorption would be >25 MWh/tonne $CO_2$[3, 20]. This preliminary energy analysis indicates that, in certain embodiments, the methods or apparatuses of the disclosure could not only currently be carried out at much lower energy requirements than traditional thermal swing processes (6.3 versus 25.0 MWh/tonne $CO_2$), but could also potentially achieve a factor of 5× higher working capacity (0.25 versus 0.05 mol $CO_2$/mol MEA).

For applications with effluents containing >1% $CO_2$, the energy requirements decrease. In certain embodiments, e.g., assuming that the initial MEA loading is about 0.5 mol $CO_2$ per mol MEA, the ratio of protons to $CO_2$ is ~2 for complete desorption. At an 80% efficiency, the methods of certain embodiments of the disclosure would require about 3.1 MWh/tonne $CO_2$ removed. If ~70% of the $H_2$ energy is recovered, this value decreases to about 1.9 MWh/tonne $CO_2$ removed. In certain embodiments, at 95% cell efficiency, the energy requirements are about 2.6 and about 1.4 MWh/tonne $CO_2$ without and with $H_2$ recovery, respectively. By comparison for a traditional thermal swing process, the reboiler duty required to desorb $CO_2$ from a loading of 0.5 to 0.25 mol $CO_2$ per mol MEA is ~1.3 MWh/tonne $CO_2$[5]. This duty increases to >2.2 MWh/tonne $CO_2$ for desorption to less than 0.20 mol $CO_2$ per mol MEA and is >5 MWh/tonne $CO_2$ for desorption from less concentrated amines (i.e., from 0.3 to 0.2 mol $CO_2$ per mol MEA)[5]. Based on these studies, the duty required for complete desorption would be >25 MWh/tonne $CO_2$ because $CO_2$ desorption is thermodynamically un-favored at low $CO_2$ loadings[5]. This preliminary energy analysis indicates that the process could currently be carried out at comparable energy requirements as traditional thermal swing processes (1.9 versus 1.3 MWh/tonne $CO_2$) but could potentially achieve a factor of 2 higher working capacity (0.5 versus 0.25 mol $CO_2$ per mol MEA).

Some embodiments of the disclosure include a method of capturing $CO_2$, comprising: reacting $CO_2$ with a solvent capable of forming an anionic complex; adjusting the pH of the solution electrochemically to less than about 7; collecting the $CO_2$ as a concentrated vapor that is released during or after the pH adjusting step; and optionally collecting the regenerated solvent. In some embodiments, the anionic complex comprises carbamate ions and/or a hydroxide (e.g., sodium hydroxide, potassium hydroxide). In some embodiments, the solvent is an amine. In some embodiments, the amine is $R_xNH_{3-x}$, wherein R is selected from an optionally substituted alkyl, ether, or alcohol.

Exemplary embodiments of amines include Primary Amines (e.g., monoethanolamine (MEA), 2-ethylaminoethanol, 2-methylaminoethanol, ethylenediamine, benzylamine); Secondary Amines (e.g., diethanolamine (DEA), pyrrolidine, morpholine, 2,6-dimethylmorpholine, monoisopropanolamine, piperazine (PZ)); Tertiary Amines (e.g., 2-(dimethylamino)ethanol (DMAE), N-tert-butyldiethanolamine (tBDEA), 3-dimethylamino-1-propanol (DMA-1P), 3-(dimethylamino)-1,2-propanediol (DMA-1,2-PD), 2-diethylaminoethanol (DEAE), 3-diethylamino-1,2-propanediol (DEA-1,2-PD), 3-diethylamino-1-propanol (DEA-1P), triethanolamine (TEA), 1-dimethylamino-2-propanol (DMA-2P), 1-(2-hydroxyethyl)pyrrolidine [1-(2HE)PRLD], 1-diethylamino-2-propanol (DEA-2P), 3-pyrrolidino-1,2-propanediol (PRLD-1,2-PD), 2-(diisopropylamino)ethanol (DIPAE), 1-(2-hydroxyethyl)piperidine [1-(2HE)PP], 2-(dimethylamino)-2-methyl-1-propanol (DMA-2M-1P), 3-piperidino-1,2-propanediol (3PP-1,2-PD), 3-dimethylamino-2,2-dimethyl-1-propanol (DMA-2,2-DM-1P), 3-hydroxy-1-methylpiperidine (3H-1MPP), N-ethyldiethanolamine, 1-ethyl-3-hydroxypiperidine), and mixtures thereof.

In certain embodiments, the pH adjusting step is performed via water electrolysis. In certain embodiments, the $CO_2$ source gas is an effluent from an industrial source. In some embodiments, the pH adjusting step is performed at a temperature of less than 100° C. In some embodiments, the regenerated amine is collected and used for the same process again. In some embodiments, the $CO_2$ source gas is from an atmospheric source. In further embodiments, the $CO_2$ source gas is a mixture of industrial and atmospheric sources.

Figure 5:
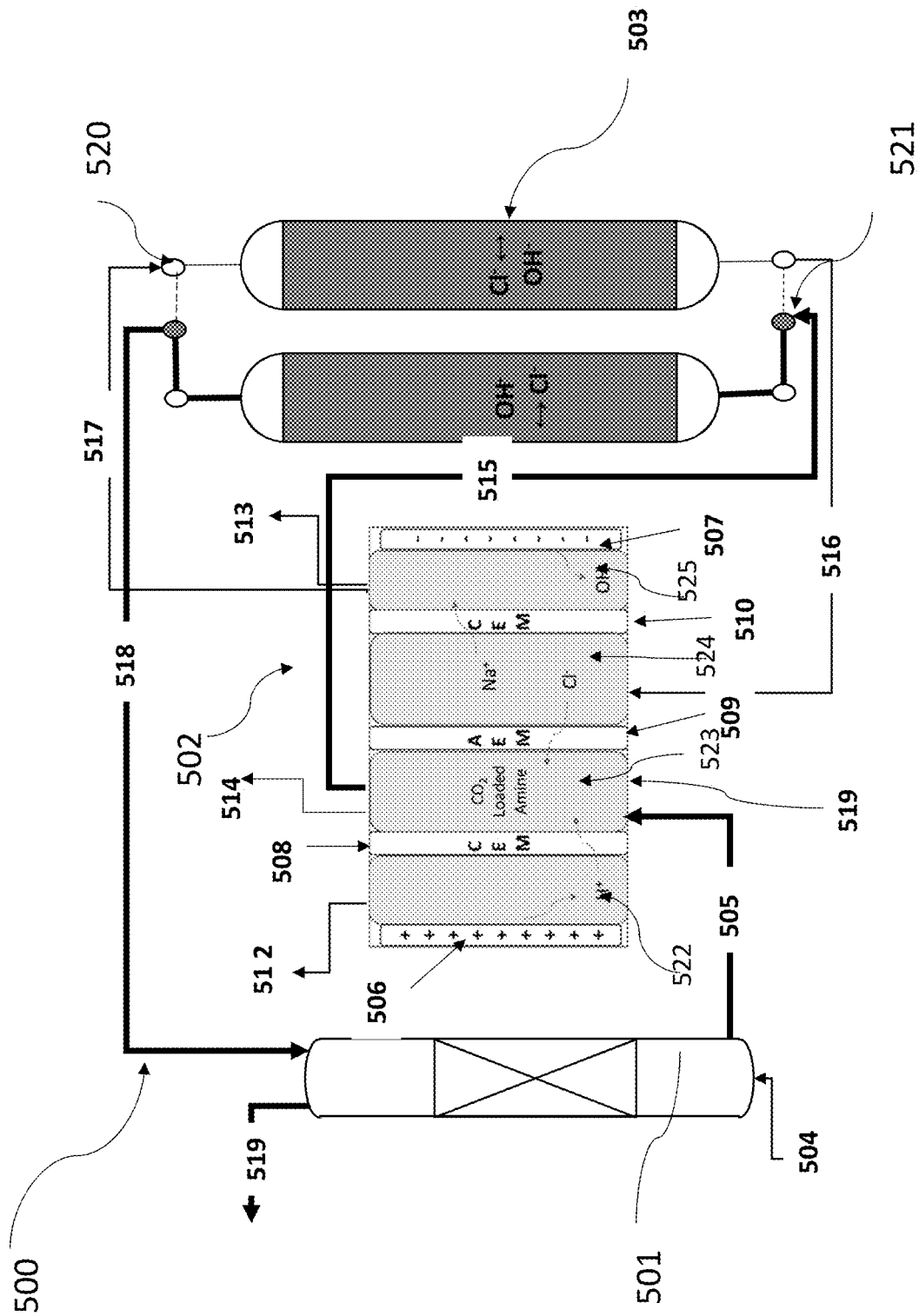
FIG. 5 depicts an exemplary system for a plant design 500 comprising a $CO_2$ absorption chamber 501, electrochemical cell 502, and anion exchange column 503. A $CO_2$-containing source gas is brought into a $CO_2$ absorption chamber 501 via inlet 504. $CO_2$ absorption chamber 501 is configured to contain an aqueous amine solution, where $CO_2$ is absorbed by the amine. The $CO_2$-rich aqueous amine solution flows into the electrochemical cell (505), where protons generated at the anode (506) cross a first cation exchange membrane (508) to desorb the $CO_2$. The protonated, $CO_2$-lean amine solution next passes (515) through the anion exchange column 503, where the chlorine counter-ion is replaced with hydroxide. The regenerated amine solution completes the closed-loop and returns (518) to the $CO_2$ absorption chamber 501 to absorb additional $CO_2$.

In certain embodiments, the disclosure provides system, such as the one shown in FIG. 5. FIG. 5 depicts an exemplary system for a plant design 500 comprising a $CO_2$ absorption chamber 501, electrochemical cell 502, and anion exchange column 503. A $CO_2$-containing source gas is brought into a $CO_2$ absorption chamber 501 via $CO_2$ source gas inlet 504. $CO_2$ absorption chamber 501 is configured to contain an aqueous amine solution, where $CO_2$ is absorbed by the amine, and further includes a scrubbed gas outlet (519). The $CO_2$-rich aqueous amine solution flows (505) into a first reservoir 523 in the electrochemical cell (502). Protons generated at the anode (506) are disposed in anode chamber 522 and can pass a first cation exchange membrane (508) and into the first reservoir to desorb the $CO_2$, thereby producing a $CO_2$-lean amine solution. Anode chamber further includes an O outlet 512. The first reservoir is further in fluid communication with a salt reservoir 524 via an anionic exchange membrane 511, such that anions can flow into the first reservoir. Electrochemical cell 502 further includes concentrated $CO_2$ vapor outlet 514. Salt reservoir 524 is in fluid communication with cathode chamber 525 via a second cation exchange membrane 510, such that cations can flow into the cathode chamber towards cathode 507. Cathode chamber 525 further includes $H_2$ outlet 513. The $CO_2$-lean amine solution is delivered (515) through the anion exchange column 503, where the chlorine counter-ion is replaced with hydroxide. A salt solution flows (516) back to salt reservoir 524, and catholyte flows from the cathode chamber to the anion exchange column. The regenerated amine solution completes the closed-loop and returns (518) to the $CO_2$ absorption chamber 501 to absorb additional CO$_2$. A sweep gas also may be provided to the system via inlet 519 to aid the desorbed gas flow. Finally, one-way (520) and two-way (521) valves can control flow in and out of anion exchange column 503.

The terms "a," "an," and "the" include plural referents unless the context clearly dictates otherwise. Thus, for example, reference to an object can include multiple objects unless the context clearly dictates otherwise.

As used herein, the terms "substantially," "substantial," "approximately," and "about," and the symbol "~," are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, a first numerical value can be deemed to be "substantially" the same or equal to a second numerical value if the first numerical value is within a range of variation of less than or equal to ±10% of the second numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

EXAMPLES

Figure 2:
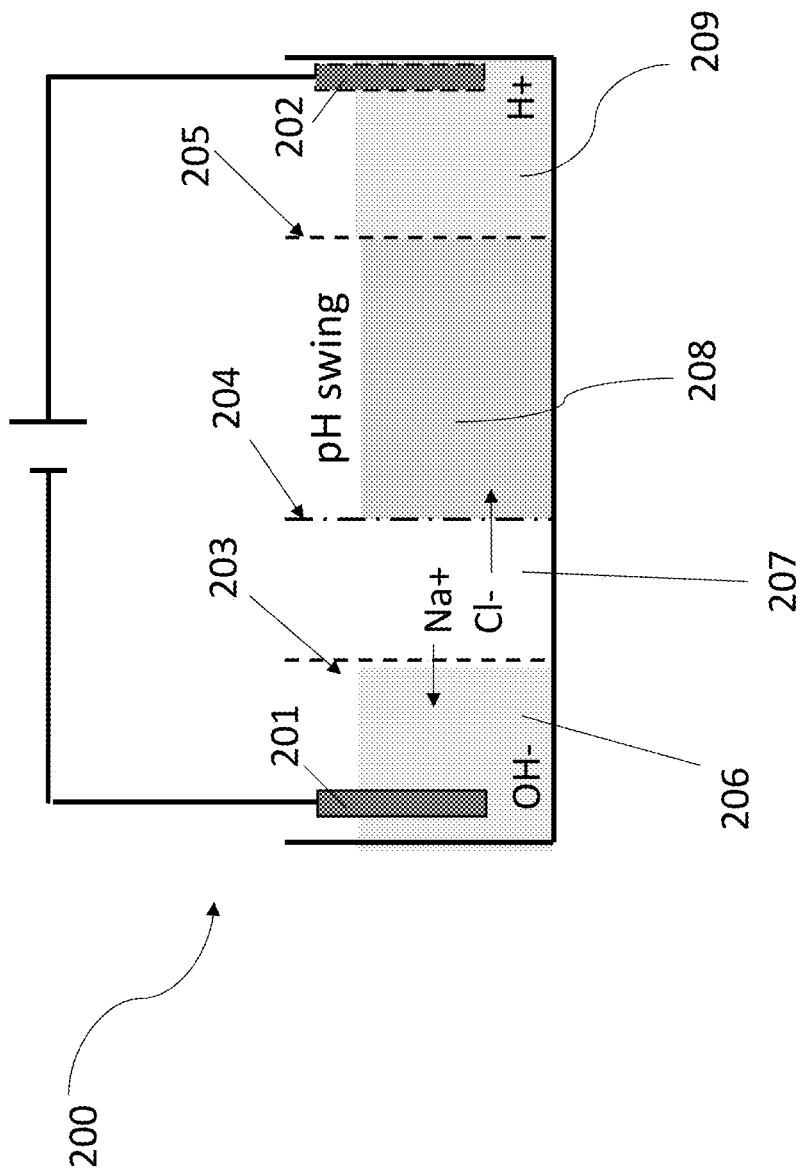
FIG. 2 is a schematic of an exemplary electrochemical cell 200 useful in amine-based $CO_2$ capture comprising a cathode 201, an anode 202, a second cation exchange membrane 203, an anion exchange membrane 204, a first cation exchange membrane 205, a base solution 206, a salt solution 207, an amine solution 208, and an acid solution 209.

A proof-of-concept of the electrochemical pH-swing system was performed using a modified electrochemical cell containing four chambers (FIG. 2). The dimensions of the cell were ~20 cm×~14 cm×~5.0 cm. The anode (~8 cm$^2$ of platinum immersed in ~0.5 M Na$_2$SO$_4$; ~2.9 cm thickness) and cathode (—8 cm$^2$ of 316 stainless steel in ~0.5 M NaCl; ~0.7 cm thickness) chambers were separated from a saturated salt (NaNO$_3$) solution (~0.7 cm thickness) and a CO$_2$-rich MEA solution (~0.5 mol CO$_2$ per mol MEA; ~0.7 cm thickness) using cation (~160 cm$^2$; Fuel cell store, FAS-PET-130) and anion exchange membranes (~160 cm$^2$; Fuel cell store, FAA-3-PK-75).

Figure 4B:
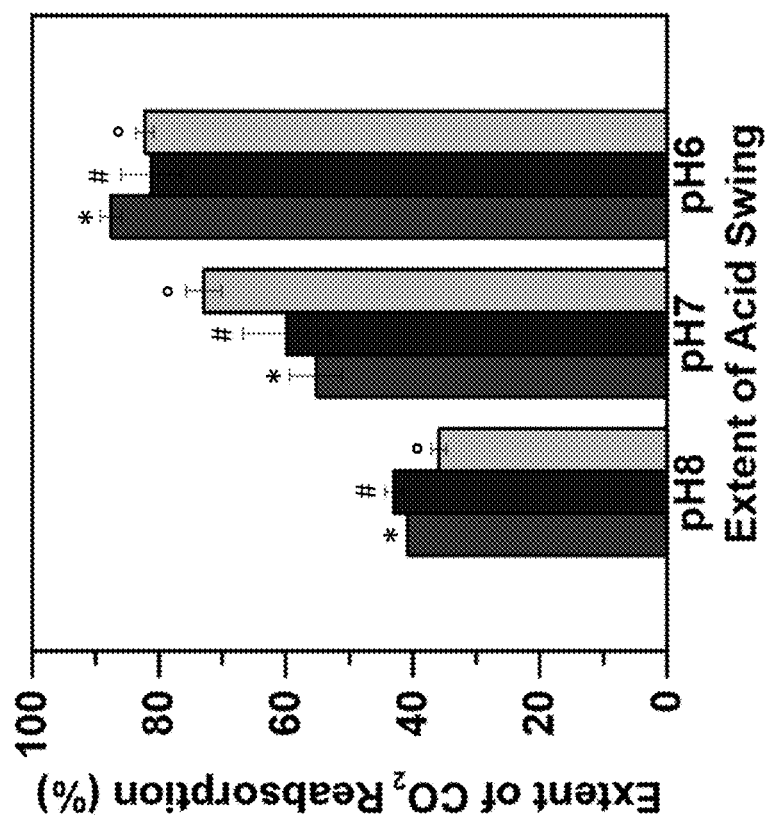
FIG. 4B shows regeneration extent for MEA solutions after acidification to pH ~6-8 followed by alkalization to pH>10.
Figure 4A:
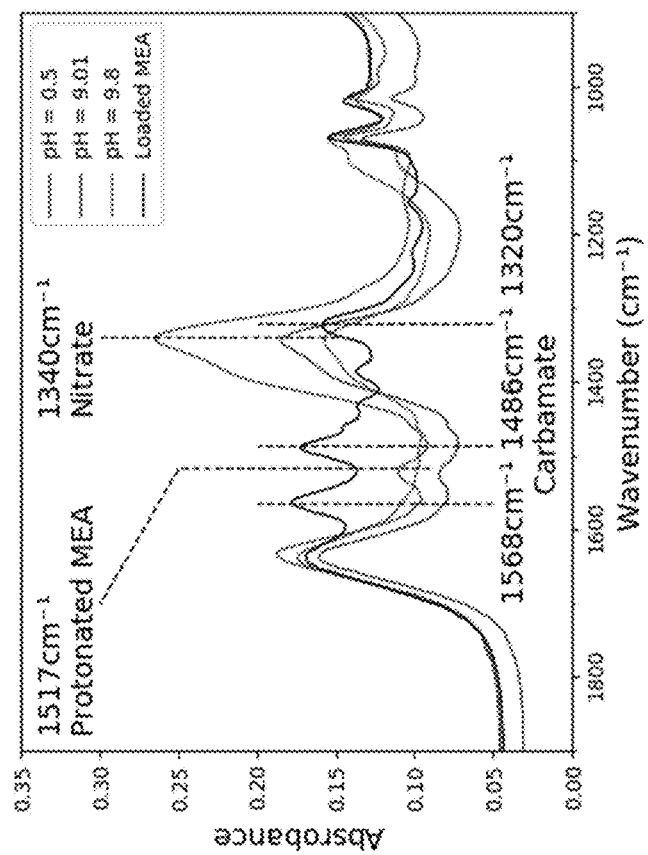
FIG. 4A shows IR spectra of $CO_2$-rich 22% v/v MEA solutions (~0.5 mol $CO_2$ per mol MEA) at various pH values from an electrochemically induced acidification cell. The black line represents $CO_2$-rich MEA prior to acidification.

Next, to demonstrate the effectiveness of the electrochemical cells of some embodiments of the disclosure, ~50 mL of 22% v/v aqueous MEA solution was saturated with CO$_2$ via bubbling CO$_2$ until a liquid phase loading of ~0.5 mol CO$_2$ per mol MEA was achieved. The liquid phase loading was quantified by continuously measuring, via gas phase infrared (IR) spectroscopy, the CO$_2$ concentration in the gas phase effluent from the bubbling chamber, and then numerically integrating the resulting concentration versus time curve. The CO$_2$-rich MEA solution was loaded into the amine chamber with ~1 M NaNO$_3$ in the salt reservoir chamber and an overpotential was applied. CO$_2$ desorption was confirmed via infrared (IR) spectroscopy of MEA samples collected at various pH values. FIG. 4A shows that the presence of carbamate ions (with characteristic peaks at 1568, 1486, 1320 cm$^{-1}$) decreases with a concomitant increase in the amount of protonated MEA (characteristic peak at 1517 cm$^{-1}$) as the experiment proceeds (and as the pH decreases). Furthermore, the peak at 1340 cm$^{-1}$ indicates the presence of nitrate ions (NO$_3^-$) accumulating in the amine solution via migration from the salt reservoir to maintain electroneutrality.

The extent of CO$_2$ desorption at pH=~6, ~7, and ~8 was quantified by shifting the pH of these amine solutions (using NaOH) to ~10 followed by contacting with the gaseous CO$_2$ stream. This method indicated that a pH decrease from ~10 to ~6 corresponded to a >80% extent of desorption/regeneration (FIG. 4B, Blue bars) at ambient temperature (~25° C.). This regeneration extent was similar to that achieved by adding aliquots of ~5 M HCl followed by ~1M NaOH to achieve a similar pH shift (i.e., HCl addition to decrease from ~10 to ~6, ~7, or ~8 followed by NaOH addition to increase back to ~10; FIG. 4B, *). To demonstrate the effectiveness of anion exchange resins to complete the pH-swing process, in certain embodiments, electrochemically acidified MEA (at pH=~6, ~7, and ~8) was mixed with a commercial anion exchange resin (~200 ml of IRN78-OH) in a batch reactor for ~5 min. The solutions were then filtered to recover the resin and to test the MEA solution for CO$_2$ absorption. The pH of MEA solutions after exposure to the resin increased to ~11, and their capacities for CO$_2$ reabsorption were similar to those of the previous experiments (FIG. 4B, #). Specifically, electrochemically acidifying a CO$_2$-rich MEA solution to pH=~6 followed by exchange with IRN78-OH to pH=~11 resulted in recovery of >80% of the initial absorption capacity. These results clearly demonstrate the effectiveness of the electrochemical-ion exchange pH-swing process for MEA regeneration at ambient temperature without capacity loss.

While the disclosure has been described with reference to the specific embodiments thereof, it should be understood by those skilled in the art that various changes may be made and equivalents may be substituted without departing from the true spirit and scope of the disclosure as defined by the appended claim(s). In addition, many modifications may be made to adapt a particular situation, material, composition of matter, method, operation or operations, to the objective, spirit and scope of the disclosure. All such modifications are intended to be within the scope of the claim(s) appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations are not a limitation of the disclosure. As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

This invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

REFERENCES

1. Keith, D. W.; Holmes, G.; St. Angelo, D.; Heidel, K. A Process for Capturing CO2 from the Atmosphere. *Joule* 2018, 2 (8), 1573-1594.
2. Keith, D. W.; Ha-Duong, M.; Stolaroff, J. K. Climate Strategy with CO2 Capture from the Air. *Clim. Change* 2006, 74 (1), 17-45.
3. Sakwattanapong, R.; Aroonwilas, A.; Veawab, A., Behavior of Reboiler Heat Duty for $CO_2$ Capture Plants Using Regenerable Single and Blended Alkanolamines. *Ind. Eng. Chem. Res.* 2005, 44, 4465-4473.
4. L v, B.; Guo B.; Zhou Z.; Jing, G., Mechanisms of CO2 Capture into Monoethanolamine Solution with Different CO2 Loading during the Absorption/Desorption Processes. *Environ. Sci. Technol.* 2015, 49, 17, 10728-10735.
5. Dutcher, B.; Fan, M.; Russell, A. G., Amine-Based CO2 Capture Technology Development from the Beginning of 2013—A Review. *ACS Appl. Mater. Interfaces* 2015, (7), 2137-2148.
6. MacDowell, N.; Florin, N.; Buchard, A.; Hallett, J.; Galindo, A.; Jackson, G.; Adjiman, C. S.; Williams, C. K.; Shah, N.; Fennell, P., An Overview of $CO_2$ Capture Technologies. *Energy Environ. Sci.* 2010, 3, 1645-1669.
7. Husebye, J.; Brunsvold, A. L.; Roussanaly, S.; Zhang, X., Techno Economic Evaluation of Amine based CO2 Capture: Impact of CO2 Concentration and Steam Supply. *Energy Procedia* 2012, 23, 381-390.
8. Roussanalya, S.; Fua, C.; Voldsunda, M.; Anantharamana, R.; Spinellib, M.; Romanob, M., Techno-economic analysis of MEA CO2 capture from a cement kiln—impact of steam supply scenario. *Energy Procedia* 2017, 114, 6229-6239.
9. Liu, Y.; Ye, H.-Z.; Diederichsen, K. M.; Van Voorhis, T.; Hatton, T. A., Electrochemically mediated carbon dioxide separation with quinone chemistry in salt-concentrated aqueous media. *Nat Commun* 2020, 11 (1), 2278-2278.
10. Rahimi, M.; Catalini, G.; Puccini, M.; Hatton, T. A., Bench-scale demonstration of CO2 capture with an electrochemically driven proton concentration process. *RSC Advances* 2020, 10 (29), 16832-16843.
11. Stern, M. C.; Hatton, T. A., Bench-scale demonstration of CO2 capture with electrochemically-mediated amine regeneration. *RSC Advances* 2014, 4 (12), 5906.
12. Stern, M. C.; Simeon, F.; Herzog, H.; Hatton, T. A., Post-combustion carbon dioxide capture using electrochemically mediated amine regeneration. *Energy & Environmental Science* 2013, 6 (8), 2505.
13. Voskian, S.; Hatton, T. A., Faradaic electro-swing reactive adsorption for CO2 capture. *Energy & Environmental Science* 2019, 12 (12), 3530-3547.
14. Wang, M.; Hariharan, S.; Shaw, R. A.; Hatton, T. A., Energetics of electrochemically mediated amine regeneration process for flue gas CO2 capture. *International Journal of Greenhouse Gas Control* 2019, 82, 48-58.
15. Wang, M.; Herzog, H. J.; Hatton, T. A., CO2 Capture Using Electrochemically Mediated Amine Regeneration. *Industrial & Engineering Chemistry Research* 2020, 59 (15), 7087-7096.
16. Wang, M.; Rahimi, M.; Kumar, A.; Hariharan, S.; Choi, W.; Hatton, T. A., Flue gas CO2 capture via electrochemically mediated amine regeneration: System design and performance. *Applied Energy* 2019, 255, 113879.
17. Adenier, A.; Chehimi, M. M.; Gallardo, I.; Pinson, J.; Vila, N., Electrochemical Oxidation of Aliphatic Amines and Their Attachment to Carbon and Metal Surfaces. *Langmuir* 2004, 20, 8243-8253.
18. Ivy, J. *Summary of Electrolytic Hydrogen Production; Milestone Completion Report NREL/MP*-560-36734; 2004.
19. Rau, G. H.; Carroll, S. A.; Bourcier, W. L.; Singleton, M. J.; Smith, M. M.; Aines, R. D., Direct electrolytic dissolution of silicate minerals for air CO2 mitigation and carbon-negative H2 production. *Proc Natl Acad Sci USA* 2013, 110 (25), 10095-10100.
20. Arshad, M. W.; Fosbøl, P. L.; von Solms, N.; Svendsen, H. F.; Thomsen, K., Equilibrium Solubility of $CO_2$ in Alkanolamines. *Energy Procedia* 2014, 51, 217-233.
21. Arshad, M. W.; Fosbøl, P. L.; Nicolas von Solms, H.; Svendsen, F.; Thomsena, K., Equilibrium Solubility of $CO_2$ in Alkanolamines. *Energy Procedia* 2014, 51, 217-223.

What is claimed is:

1. A method of capturing $CO_2$, comprising the acts of:
   i) reacting a $CO_2$ source gas with a first aqueous solution comprising a stoichiometric excess of an amine to form an amine-$CO_2$ complex, thereby forming a second aqueous solution comprising the amine-$CO_2$ complex;
   ii) electrochemically adjusting the pH of the second aqueous solution to less than 7 at from about −10° C. to about 50° C., thereby releasing $CO_2$ from the amine-$CO_2$ complex and forming a third aqueous solution comprising the amine; and
   iii) collecting the released $CO_2$ as a concentrated vapor and passing the third aqueous solution through an anion exchange column, thereby increasing the pH of the third aqueous solution and forming a fourth aqueous solution comprising the amine.

2. The method of claim 1, wherein the amine-$CO_2$ complex comprises carbamate ions.

3. The method of claim 1, wherein electrochemically adjusting the pH of the second solution is performed via water electrolysis.

4. The method of claim 1, wherein the pH of the third aqueous solution is about 0.5 to about 6.

5. The method of claim 1, wherein the pH of the third aqueous solution is about 0.5 to about 5.

6. The method of claim 1, wherein the pH of the third aqueous solution is about 0.5 to about 4.

7. The method of claim 1, wherein the pH of the third aqueous solution is about 0.5 to about 3.

8. The method of claim 1, wherein the pH of the third aqueous solution is about 0.5 to about 2.

9. The method of claim 1, wherein the third pH is about 0.5 to about 1.5.

10. The method of claim 1, wherein the third pH is about 5 to about 6.

11. The method of claim 1, wherein the amine is a primary amine, a secondary amine, a tertiary amine, or a mixture thereof.

12. The method of claim 11, wherein the amine is a primary amine or a secondary amine.

13. The method of claim 11, wherein the amine has a structure of formula I:

$$R_xNH_{3-x},\qquad(I);$$

wherein R is selected from an optionally substituted alkyl, ether, and hydroxyalkyl;

x is 1, 2 or 3, and;

one or more R, together with each N, optionally forms a nitrogen containing heterocycle.

14. The method of claim 11, wherein the amine is chosen from monoethanolamine, 2-ethylaminoethanol, 2-methylaminoethanol, ethylenediamine, benzylamine, diethanolamine, pyrrolidine, morpholine, 2,6-dimethylmorpholine, monoisopropanolamine, piperazine 2-(dimethylamino)ethanol, N-tert-butyldiethanolamine, 3-dimethylamino-1-propanol, 3-(dimethylamino)-1,2-propanediol, 2-diethylaminoethanol, 3-diethylamino-1,2-propanediol, 3-diethylamino-1-propanol, triethanolamine, 1-dimethylamino-2-propanol, 1-(2-hydroxyethyl)pyrrolidine, 1-diethylamino-2-propanol, 3-pyrrolidino-1,2-propanediol, 2-(diisopropylamino)ethanol, 1-(2-hydroxyethyl)piperidine, 2-(dimethylamino)-2-methyl-1-propanol, 3-piperidino-1,2-propanediol, 3-dimethylamino-2,2-dimethyl-1-propanol, 3-hydroxy-1-methylpiperidine, N-ethyldiethanolamine, 1-ethyl-3-hydroxypiperidine, and any combination thereof.

15. The method of any one of claim 14, wherein the amine is

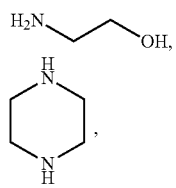

or a mixture thereof.

16. The method of claim 14, wherein the amine is:

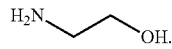

17. The method of claim 14, wherein the amine is:

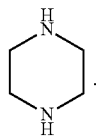

18. The method of claim 1, wherein the concentration of the amine in the first aqueous amine solution is about 10% to about 50% v/v.

19. The method of claim 18, wherein the concentration of the amine in the first aqueous solution is about 15% to about 40% v/v.

20. The method of claim 18, wherein the concentration of the amine in the first aqueous solution is about 20 to about 30% v/v.

21. The method of claim 1, wherein the $CO_2$ source gas is an effluent from an industrial source.

22. The method of claim 21, wherein the gas from the industrial source comprises about 1 to about 12% v/v $CO_2$.

23. The method of claim 1, wherein the $CO_2$ source gas is from an atmospheric source.

24. The method of claim 1, further comprising using the fourth aqueous solution in step (i) of the method.

25. The method of claim 1, wherein the concentrated vapor comprises about 2% to about 99% $CO_2$.

26. The method of claim 1, wherein electrochemically adjusting the pH of the second solution to less than 7 is performed at from about 20° C. to about 40° C.

27. The method of claim 1, wherein electrochemically adjusting the pH of the second solution to less than 7 is performed at about ambient temperature.

28. The method of claim 1, wherein the method further comprises regenerating the anion exchange column by contacting the anion exchange column with a fifth aqueous solution comprising aqueous hydroxide.

29. The method of claim 1, wherein:

electrochemically adjusting the pH of the second aqueous solution to less than 7 further comprises adding one or more counter-anions to the second aqueous solution;

the third aqueous solution further comprises one or more counterions selected from Cl⁻ and; and passing the third aqueous solution through the anion exchange column comprises exchanging the one or more counter-anions for hydroxide ions.

30. The method of claim 1, wherein the fourth aqueous solution has a pH suitable for use in step (i) of the method.

* * * * *